(12) United States Patent
Lazzerini

(10) Patent No.: US 7,390,556 B2
(45) Date of Patent: Jun. 24, 2008

(54) SECURITY ELEMENT, SUCH AS A THREAD, STRIP AND THE LIKE, FOR SECURITY DOCUMENTS

(75) Inventor: Maurizio Lazzerini, Cerro al Lambro (IT)

(73) Assignee: Fabriano Securities S.r.l., Arco (IT)

( * ) Notice: Subject to any disclaimer, the term of this patent is extended or adjusted under 35 U.S.C. 154(b) by 352 days.

(21) Appl. No.: 10/554,683

(22) PCT Filed: May 5, 2004

(86) PCT No.: PCT/EP2004/004767

§ 371 (c)(1),
(2), (4) Date: Oct. 27, 2005

(87) PCT Pub. No.: WO2004/098900

PCT Pub. Date: Nov. 18, 2004

(65) Prior Publication Data

US 2006/0255586 A1    Nov. 16, 2006

(30) Foreign Application Priority Data

May 8, 2003 (IT) .......................... MI2003A0929

(51) Int. Cl.
*B32B 3/00* (2006.01)
*B32B 7/00* (2006.01)
*B32B 15/00* (2006.01)

(52) U.S. Cl. .................. 428/209; 428/156; 428/172; 428/690; 283/72

(58) Field of Classification Search ................ 428/156, 428/172, 209, 690; 283/72
See application file for complete search history.

(56) References Cited

U.S. PATENT DOCUMENTS

| | | | |
|---|---|---|---|
| 4,025,673 A * | 5/1977 | Reinnagel | .................... 428/29 |
| 4,579,754 A | 4/1986 | Maurer et al. | |
| 5,176,405 A | 1/1993 | Kaule et al. | |
| 6,127,034 A | 10/2000 | Chorley | |
| 2001/0028169 A1 | 10/2001 | Lazzerini | |

FOREIGN PATENT DOCUMENTS

| | | | |
|---|---|---|---|
| WO | WO 97/19820 A1 | 6/1997 |
| WO | WO 02/101147 A1 | 12/2002 |
| WO | WO 2004/014665 A1 | 2/2004 |

* cited by examiner

*Primary Examiner*—Callie Shosho
*Assistant Examiner*—David J Joy
(74) *Attorney, Agent, or Firm*—Modiano & Associati; Albert Josif; Daniel J. O'Byrne

(57) ABSTRACT

A security element, such as a thread, strip and the like, for security documents in general, which comprises a flexible backing layer that has, on at least one face, a layer of metallic material provided with regions in which the thickness of the metal is less than 70% and more than 25% of the thickness of the layer of metallic material of the nearby portions, and further comprises a layer of embossed holographic lacquer between the backing layer and the layer of metallic material.

18 Claims, 2 Drawing Sheets

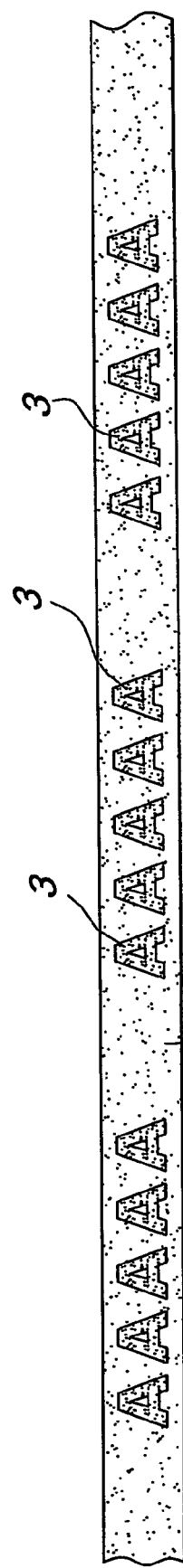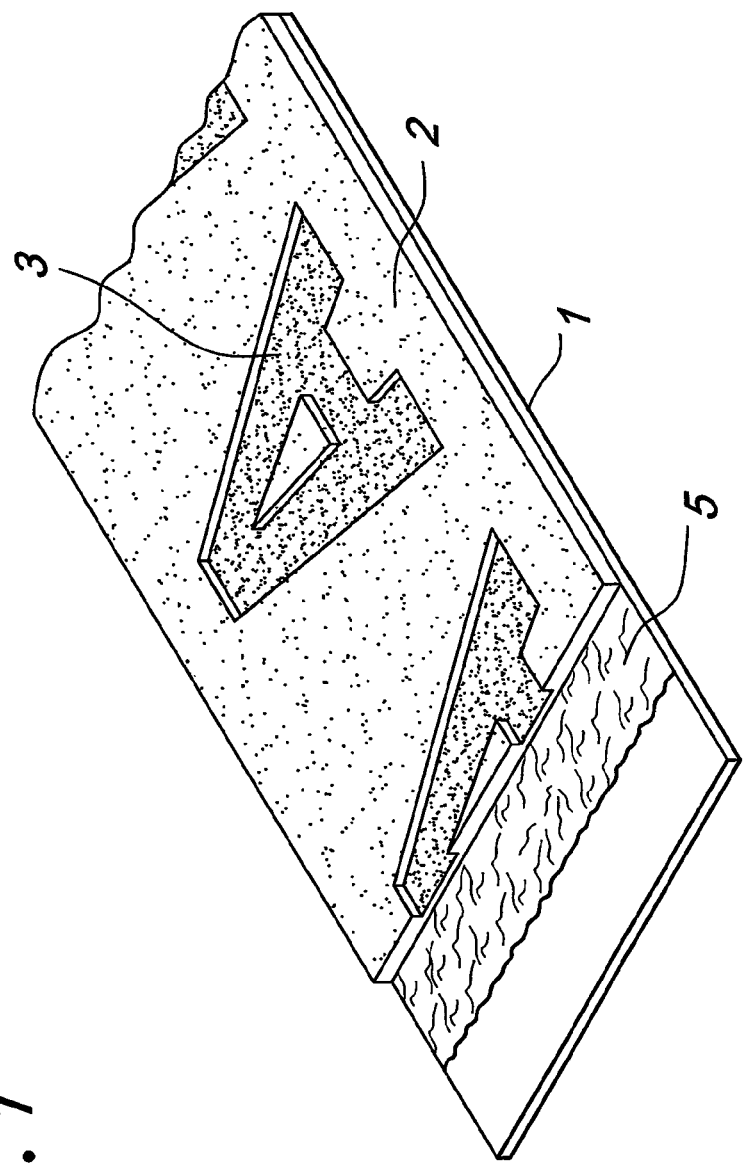

SECURITY ELEMENT, SUCH AS A THREAD, STRIP AND THE LIKE, FOR SECURITY DOCUMENTS

TECHNICAL FIELD

The present invention relates to a security element such as thread, strip, patch and the like for security documents in general.

BACKGROUND ART

As is known, security threads that allow correct interpretation even by visual inspection, without necessarily resorting to particular instruments or devices, have already been used in the production of security documents, such as for example bank notes, certificates, passports and the like.

Among solutions of this kind, mention should be made of a security thread, disclosed in EP 0 319 157, which is substantially constituted by a strip of plastic material on which a layer of metallic material, generally aluminum, is deposited; areas are provided thereon in which graphic markings, text or the like are written in hollow form, since they are formed by metal-free regions located so as to maintain the metallic continuity of the thread.

The most widely used solution for producing this thread is the use of systems for demetallizing aluminum vaporized in vacuum on a polyester film.

Over time, it has been found that this type of execution, which initially had a good degree of security, can be circumvented, since counterfeiters, by virtue of the increased availability of technology, have succeeded in providing very valid simulations by virtue of punch transfer methods or even by using laser beams for marking.

Another known solution that used this type of thread entailed insertion in the paper with the so-called windowing technique, disclosed for example in U.S. Pat. No. 4,186,943, which provided for the insertion of the strip in the paper with protrusion of the thread in a selected and controlled position so as to be able to see all the characteristics of the security thread in reflected light in the places where it lies outside the paper and the texts or graphic markings without metal in transmitted light in the places where the thread is inserted in the paper, thus achieving a further function for such thread.

In this case also, counterfeiters have been able to simulate the thread system by depositing similar materials, by using a punch and/or laser beam technique.

To increase the degree of security, solutions have already been devised in which additional security elements were applied to the thread with a holographic technique or the like, but in these solutions the text region provided in hollow form, or with partial or complete covering of the text, as disclosed for example in EP 0 330 733, produced an absence of holographic detection also on the character or graphic markings, so that the counterfeiter could still use punch or laser application.

DISCLOSURE OF THE INVENTION

The aim of the invention is to eliminate the drawbacks cited above, by providing a new type of security element, such as a thread, strip, patch and the like, for security documents in general, that allows to extend considerably the degree of protection, combining with conventional threads the possibility to have a holographic representation or otherwise a representation that varies the colors that are reflected as a function of the type of light and of the angle with which they are struck.

Within this aim, an object of the invention is to provide a security element in which it is possible to have continuity of the holographic characteristics or of the color variation also in the regions where text is provided.

Another object of the present invention is to provide a security element that thanks to its particular constructive characteristics is capable of giving the greatest assurances of reliability and safety in use.

Another object of the present invention is to provide a security element, such as a thread, strip and the like, for security documents in general, that can be obtained easily starting from commonly commercially available elements and materials and is also competitive from a merely economical standpoint.

This aim and these and other objects that will become better apparent hereinafter are achieved by a security element, such as a thread, strip and the like, for security documents in general, according to the invention, which comprises a flexible backing layer that has, on at least one face, a layer of metallic material provided with regions in which the thickness of the metal is less than 70% and more than 25% of the thickness of the layer of metallic material of the nearby portions, characterized in that it comprises a layer of embossed holographic lacquer.

BRIEF DESCRIPTION OF THE DRAWINGS

Further characteristics and advantages of the invention will become better apparent from the description of a preferred but not exclusive embodiment of a security element, such as a thread, strip and the like, for security documents in general, illustrated by way of nonlimiting example in the accompanying drawings, wherein:

FIG. 1 is a schematic view of the security element according to the invention, in the form of a strip;

FIG. 2 is a layered view of the security element of FIG. 1;

WAYS TO CARRYING OUT THE INVENTION

Figure 3:
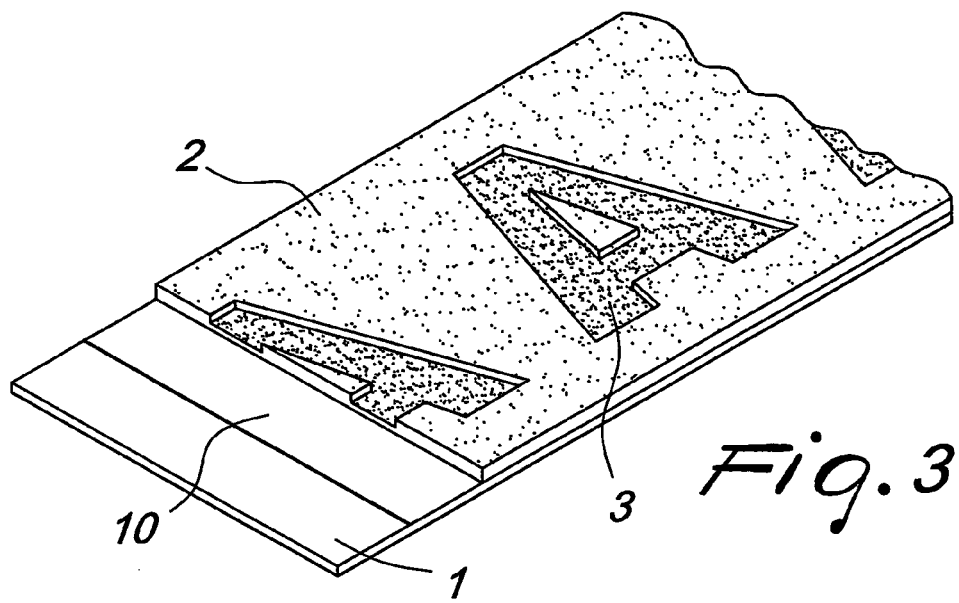
FIG. 3 is a layered view of a security element with a layer of color-shifting material.

With reference to the figures, the security element, such as a thread, strip, patch and the like, for security documents in general, comprises a flexible backing layer, designated by the reference numeral 1, which is advantageously made of polyester according to conventional methods.

A layer of metallic material 2 is provided on the backing layer 1, and on said layer there are regions, schematically designated by the reference numeral 3, in which the thickness of the metal is less than 70% and more than 25% of the thickness of the layer of metallic material of the nearby portions, i.e., the thickness is therefore comprised between 25 and 70% of the thickness of the layer of metallic material of the nearby portions, as shown in WO 2004/014665 A1, which is assumed included herein by reference.

Explicitly with reference to FIGS. 1 and 2, an important particularity of the invention consists in that a holographic lacquer, designated by the reference numeral 5, is preferably interposed between the backing layer 1 and the layer of metallic material 2, and is embossed so as to provide a holographic representation or optionally an exelgram, a pixelgram, an e-beam, a kinegram and so forth; although the best results have been achieved with the solution described above, the holographic lacquer can also be arranged on top of the metallic layer or on the other face of the backing layer.

The holographic lacquer 5 is covered completely by the aluminum, which is deposited in vacuum and, after providing the regions 3, a continuity of the hologram is obtained even in the regions 3 that show graphic markings, designs, letters and so forth, differently from the solutions of the background art; which provided an interruption of the hologram at the recessed regions that constituted the text, since the metallic layer was not present in these regions.

With the embodiment described above, by using a layer that has metallic continuity on its entire surface it is possible to combine the possibility to detect the reduced-thickness regions that in practice constitute the recessed lettering with the additional security that arises from the presence of the hologram, which has continuity on the various thicknesses of metal, and accordingly a variation of the holographic representation is obtained while maintaining its continuity.

Figure 4:
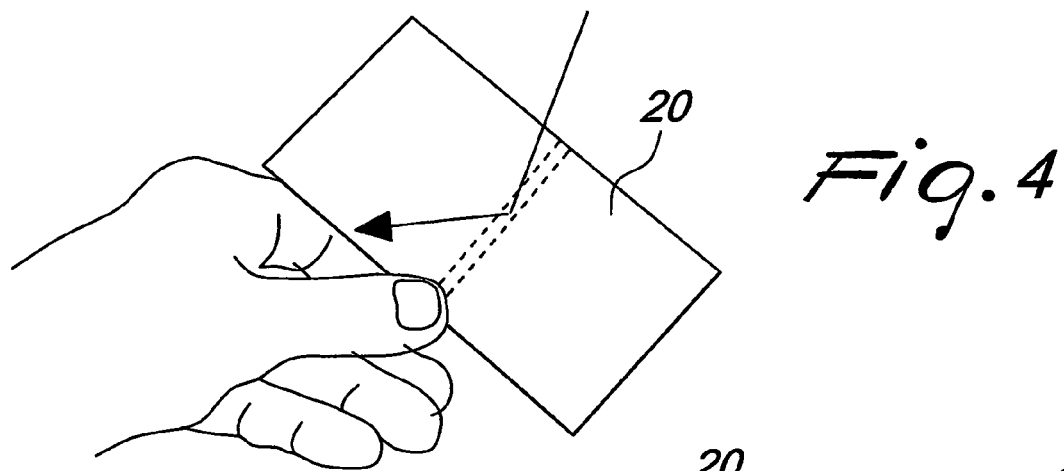
FIG. 4 is a schematic view showing an embedded thread of the document that cannot be detected in reflected light.
Figure 5:
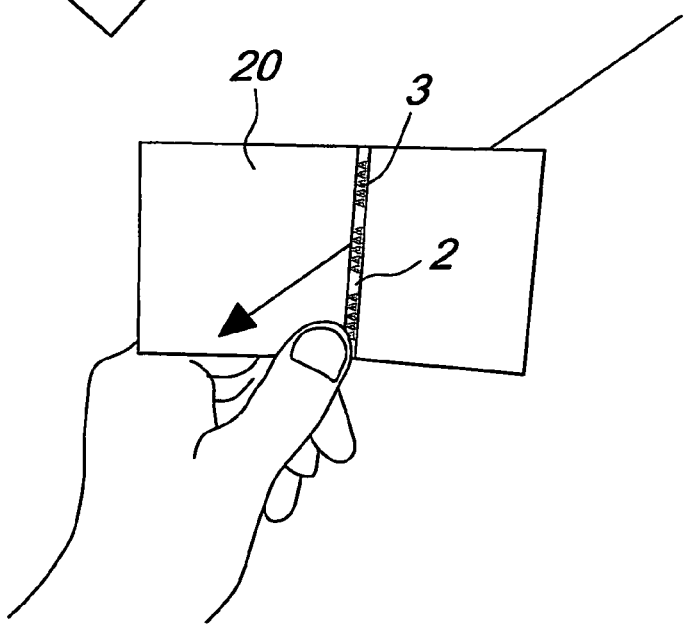
FIG. 5 is a schematic view, showing the thread that is detectable in transmitted light.

According to what is shown in FIGS. 3 to 5, the security element is again constituted with the base layer, designated by the reference numeral 1, and with the layer of metallic material 2 provided with the regions 3, in a manner fully similar to what has been described earlier.

The difference arises from the fact that there is a layer of material 10 that shifts color depending on the type of light and on the angle of incidence of the light; the color-shifting layer 10 is provided for example by a fluorescent ink or color-shifting ink that allows to have color-shifting areas in a parallel and/or alternating manner and in any case in register with the regions 3 that have a different thickness of metal; the color-shifting layer can optionally have a solid background.

Furthermore, with the thread inserted in the document, generally designated by the reference numeral 20, the thread is not visible in reflected light, as shown in FIG. 4, and is instead visible in transmitted light and, if viewed from the side provided with the metallic layer, the typical characteristic of the metallic layer is combined with the color variability that is provided by the layer 10 made of a material that has particular color properties.

It should be noted that the thread can be embedded completely in the document or inserted with the so-called "windowing" technique. The security element, once inserted in the document is always visible at openings provided on at least one face of the document.

The layer 10 can be arranged in the most disparate manner, i.e., it can be arranged so as to have portions that are alternated with the regions 3 or optionally continuously and in any case in any type of application that allows to define a constant relation between the presence of the layer and the regions 3.

Another possibility to increase the security characteristics is to provide magnetic elements in register with the regions 3; said magnetic elements can be of different kinds and can be for example of the type shown in EP 310707.

From the above description it is thus evident that the invention achieves the intended aim and objects, and in particular the fact is stressed that a security element, such as a thread, strip and the like is provided which allows, by using a continuous metallic layer, to have continuity in the holographic representation and continuity even if inks that produce color-shifting effects are used, while having a differentiation of the color aspect depending on the different thickness of the metallic layer.

The invention thus conceived is susceptible of numerous modifications and variations, all of which are within the scope of the appended claims.

All the details may further be modified according to requirements.

The disclosures in Italian Patent Application No. MI2003A000929 from which this application claims priority are incorporated herein by reference.

What is claimed is:

1. A security element for security documents, comprising a flexible backing layer that has, on at least one face, a layer of metallic material provided with regions in which a thickness of the metal is less than 70% and more than 25% of a thickness of the layer of metallic material of all other portions of the layer; and a layer of embossed holographic lacquer.

2. The security element according to claim 1, wherein said layer of holographic lacquer is ranged between said backing layer and said layer of metallic material.

3. The security element according to claim 1, wherein said layer of holographic lacquer is arranged on top of said layer of metallic material.

4. The security element according to claim 1, wherein said layer of holographic lacquer is arranged on said backing layer, on the opposite face with respect to said metallic layer.

5. The security element according to claim 1, inserted in a document, and which is always visible at openings provided on at least one face of said document.

6. The security element according to claim 1, comprising magnetic elements in register with said regions.

7. The security element according to claim 6, wherein said magnetic elements provide a magnetically detectable code.

8. A security element for security documents, comprising a flexible backing layer that has, on at least one face, a layer of metallic material provided with regions in which a thickness of the metal is less than 70% and more than 25% of a thickness of the layer of metallic material of all other portions of the layer, and further comprising, on said backing layer, a layer of material that shifts color under light according to the type of light and angle of incidence of the light, said layer of color-shifting material being in register with said regions.

9. The security element according to claim 8, wherein a holographic representation visible on said metallic layer is different between said regions and the remaining part.

10. The security element according to claim 8, wherein said layer of color-shifting material is applied with a solid background.

11. The security element according to claim 8, wherein said layer of color-shifting material is arranged between said backing layer and said layer of metallic material.

12. The security element according to claim 8, wherein said layer of color-shifting material is arranged above said metallic layer.

13. The security element according to claim 8, wherein said layer of color-shifting material is arranged on said backing layer, on the opposite face with respect to said metallic layer.

14. The security element according to claim 8, wherein said layer of color-shifting material is constituted by a fluorescent ink.

15. The security element according to claim 8, wherein said layer of color-shifting material is constituted by a layer of color-changing ink.

16. The security element according to claim 8, wherein said layer of color-shifting material is arranged so as to be parallel and/or alternated with respect to said regions.

17. The security element according to claim 8, wherein said security element, once inserted in the document, is invisible in reflected light and is visible in transmitted light.

18. A document, comprising a security element as set forth in claim 8.

* * * * *